United States Patent
Vallis et al.

(10) Patent No.: US 6,710,953 B1
(45) Date of Patent: Mar. 23, 2004

(54) METHOD AND DISK DRIVE FOR IMPROVING DATA STORAGE CAPACITY OF DATA TRACKS USING PUSH-DOWN WEDGES

(75) Inventors: Mark F. Vallis, Rancho Santa Margarita, CA (US); Ara W. Nazarian, Tustin, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 312 days.

(21) Appl. No.: 09/823,738

(22) Filed: Mar. 30, 2001

(51) Int. Cl.[7] .................................................. G11B 27/36
(52) U.S. Cl. ............................. 360/31; 360/53; 360/60; 360/75; 360/77.04
(58) Field of Search ......................... 360/77.05, 77.08, 360/78.09, 77.01, 53, 31, 77.04, 75, 60

(56) References Cited

U.S. PATENT DOCUMENTS

| | | | | |
|---|---|---|---|---|
| 5,392,290 A | * | 2/1995 | Brown et al. ................... 714/6 |
| 5,818,654 A | * | 10/1998 | Reddy et al. .................. 360/53 |
| 5,930,068 A | * | 7/1999 | Gregg et al. .............. 360/77.05 |
| 5,956,196 A | * | 9/1999 | Hull et al. ...................... 360/65 |
| 6,320,718 B1 | * | 11/2001 | Bouwkamp et al. ...... 360/77.04 |
| 6,442,715 B1 | * | 8/2002 | Wilson ........................ 714/710 |

* cited by examiner

Primary Examiner—David Hudspeth
Assistant Examiner—Natalia Figueroa
(74) Attorney, Agent, or Firm—Milad G. Shara, Esq.; Robroy R. Fawcett, Esq.

(57) ABSTRACT

A disk drive implements a technique for improving data storage capacity of data tracks having a servo wedge defect. A servo-fault position threshold is established for aborting a write operation if a transducer head position error from a circular track centerline exceeds the servo-fault position threshold. Servo wedges having operation, the servo-fault position threshold is ignored at a tagged servo wedge thereby preventing the tagged servo wedge from aborting a write operation. The data write operation is prevented for a predetermined number of servo wedges immediately following the tagged servo wedge by skipping data wedges between the tagged servo wedge and a last servo wedge of the predetermined number of servo wedges. Data may be written to a data wedge immediately following the last servo wedge.

18 Claims, 3 Drawing Sheets

METHOD AND DISK DRIVE FOR IMPROVING DATA STORAGE CAPACITY OF DATA TRACKS USING PUSH-DOWN WEDGES

BACKGROUND OF THE INVENTION

1. Field of the Invention

The present invention relates to disk drives and more particularly to a technique for improving utilization of partially defective data tracks in a disk drive.

2. Description of the Prior Art

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives. The increased TPI has resulted in tighter track tolerances. During initial configuration of a disk drive by the manufacturer, a track that is not completely within tolerance is skipped and eventually replaced by a spare track set aside for such purpose. Setting aside a sufficient number of spare tracks to insure that the disk drive yields a desired capacity tends to conflict with the demand for increased storage capacity.

Accordingly, there exists a need for a technique that enables a disk drive to minimize the need for setting aside and using spare tracks for replacing tracks that are not completely within tolerances, without unnecessarily increasing the disk drive's manufacturing cost. The present invention satisfies this need.

SUMMARY OF THE INVENTION

The present invention may be embodied in a method and a disk drive for improving data storage capacity of concentric data tracks on a rotating disk of the disk drive. Each data track includes a plurality of embedded servo wedges separating a plurality of data wedges. In the method, a servo-fault position threshold is established for aborting a write operation if a transducer head position error from a circular track centerline exceeds the servo-fault position threshold. Servo wedges having defects are tagged, and during a track following operation, the servo-fault position threshold is ignored at a tagged servo wedge thereby preventing the tagged servo wedge from aborting a write operation. The write operation is prevented for a predetermined number of servo wedges immediately following the tagged servo wedge by skipping data wedges between the tagged servo wedge and a last servo wedge of the predetermined number of servo wedges. Data is then written to a data wedge immediately following the last servo wedge.

In a more detailed feature of the invention, the method may include storing location information for the tagged servo wedges in read/writeable non-volatile semiconductor memory or in reserved data wedges on the disk. The stored location information for the tagged servo wedges may be transferred to dynamic random access memory for the track following operation. The predetermined number of servo wedges may be between about 7 and 10 for a track having more than about 70 embedded servo wedges. A servo wedge may be tagged if the servo wedge has a position from a respective circular track centerline that is greater than the servo-fault threshold or if it includes an embedded data error. Data segments may be located in the data wedges independently of locations of the servo wedges.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
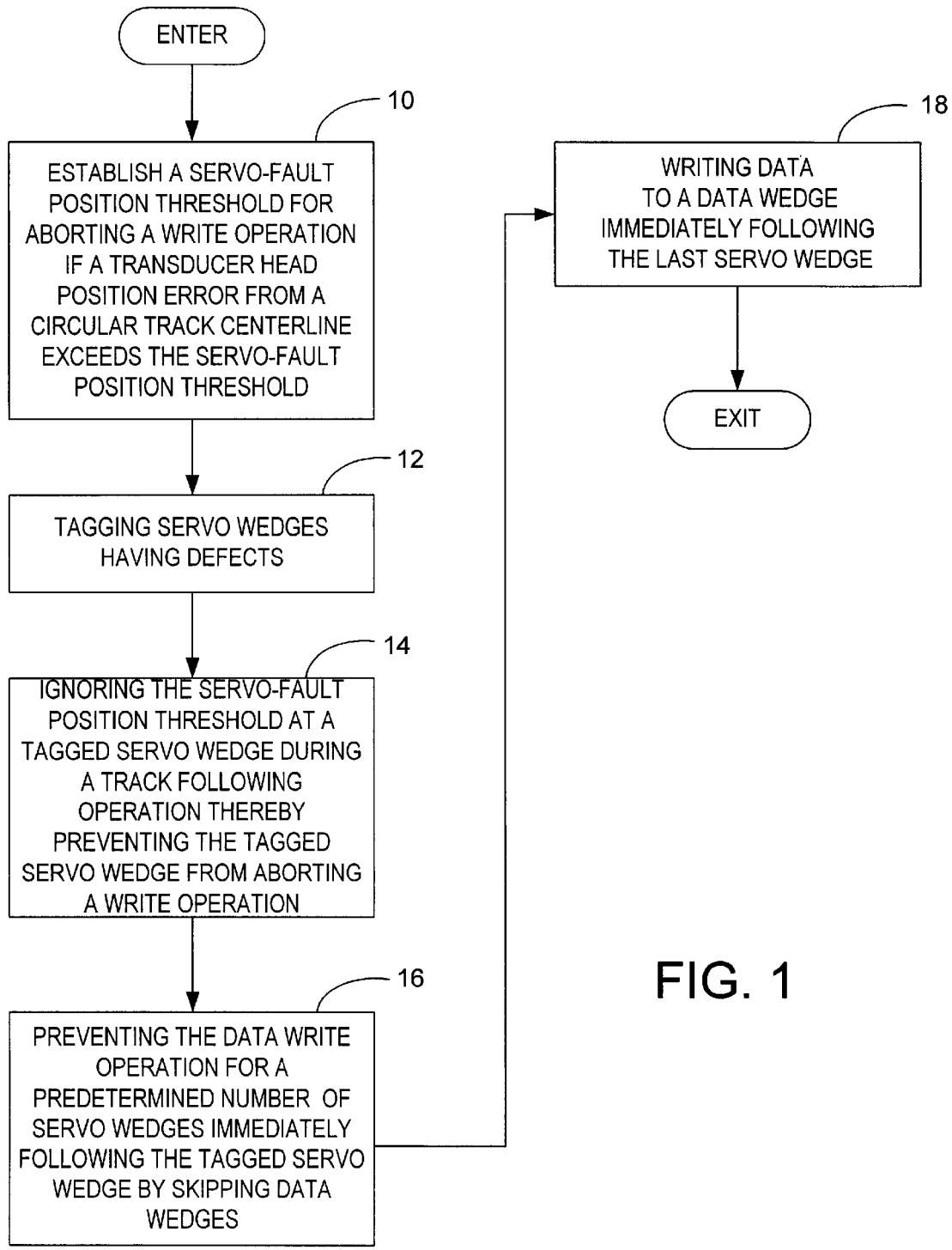
FIG. 1 is a flow diagram illustrating a method for improving data storage capacity in a disk drive by ignoring a servo-fault position threshold at a defective servo wedge during a track following operation, according to the present invention.
Figure 2:
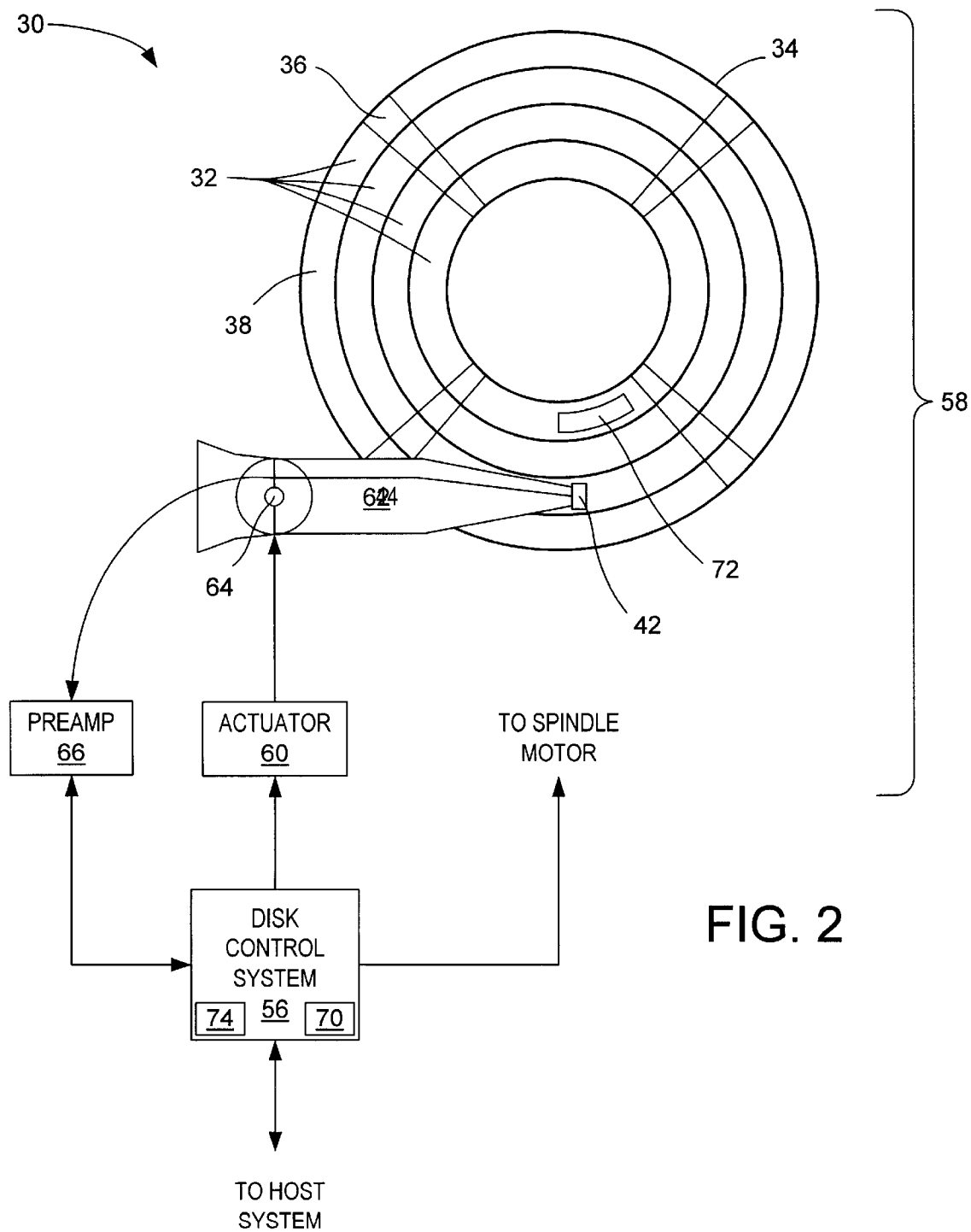
FIG. 2 is a block diagram of a disk drive for improving data storage capacity by ignoring a servo-fault position threshold at a defective servo wedges during a track following operation, according to the present invention.
Figure 3:
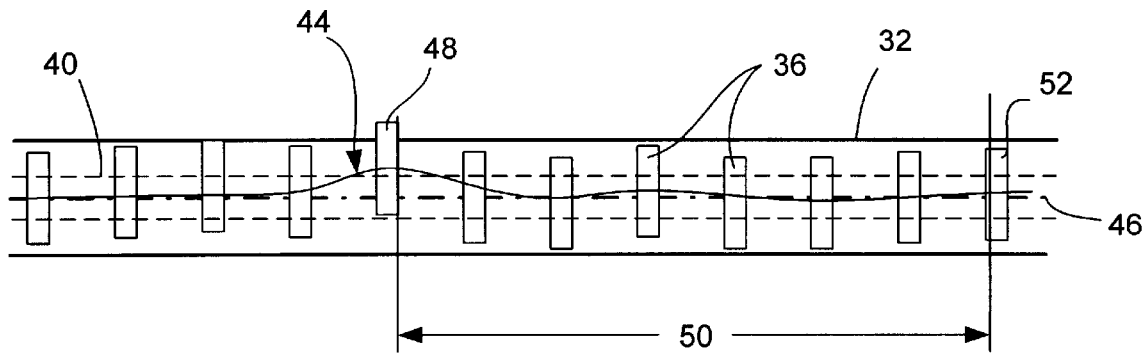
FIG. 3 is a schematic diagram of a head position trace as the head encounters a defective servo wedge during a track following operation.

With reference to FIGS. 1, 2 and 3, the present invention may be embodied in a method (FIG. 1) for improving data storage capacity in a disk drive 30 (FIG. 2) by accounting for a known servo wedge defect during a track following operation. The disk drive includes a plurality of concentric data tracks 32 on a storage surface of a rotating disk 34. Each data track includes a plurality of embedded servo wedges 36 separating a plurality of data wedges 38. In the method, a servo-fault position threshold 40 (FIG. 3) is established for aborting a write operation if a transducer head 42 position error 44 from a circular track centerline 46 exceeds the servo-fault position threshold (step 10). Servo wedges having defects are tagged (step 12), and during a track following operation, the servo-fault position threshold is ignored at a tagged servo wedge 48 thereby preventing the tagged servo wedge from aborting a write operation (step 14). The write operation is prevented for a predetermined number 50 of servo wedges immediately following the tagged servo wedge 48 by skipping data wedges between the tagged servo wedge 48 and a last servo wedge 52 of the predetermined number of servo wedges (step 16). Data is then written to a data wedge 38 immediately following the last servo wedge, (step 18).

The disk drive 30 generally comprises a disk control system 56 and a head disk assembly (HDA) 58. The HDA includes the magnetic disk 34 having the plurality of concentric data tracks 32 recorded thereon, the head 42 for writing user data to or reading user data from a selected one of the data tracks in response to host command during a user operation of the disk drive, and an actuator 60 for positioning the head over the selected track. The head 42 in present disk drives comprises a giant magneto-resistive (GMR) read element and thin film inductive write element. The actuator is typically implemented as a voice coil motor (VCM) which rotates an actuator arm 62 about a pivot 64 in order to position the head radially over the disk in response to control signals from the disk control system.

In addition to the disk 38, the head 42, and the actuator 60, the HDA 58 includes a preamplifier 66 and a spindle motor (not shown) for rotating the disk. The head communicates with the disk control system 56 via the preamplifier. The disk control system also includes circuitry and processors that provide an intelligent disk control system interface between a host system (not shown) and the HDA for execution of read and write commands. The processors may include a digital microprocessor for implementing the methods and techniques of the invention under software control.

The disk control system 56 implements a servo control loop which causes the head 42 to follow the centerline 46 of the selected track 32 in an operation generally referred to as "track following." During track following, the path of the head wanders about the track centerline. Typically, the disk control system attempts to limit the head wander to within a predetermined range defined by a "Track Misregistration" (TMR) budget using the servo control loop.

During a write operation, if the head 42 wanders from the track center 46 beyond the servo-fault position threshold 40 of about 15 percent of the track-to-track distance, the disk control system 56 inhibits the write operation. During initial writing of the embedded servo wedges 36 by the disk drive manufacturer, position and data errors may be permanently incorporated into an embedded servo wedge resulting in a defective servo wedge. The defective servo wedge will result in a track following error which inhibits the current operation every time the defective servo wedge is encountered during a track following operation. In existing disk drives, a track 32 having a defective servo wedge 48 is "pushed down," meaning the track is skipped and eventually replaced by a spare track during initial configuration and physical formatting of the disk drive 30 by the disk-drive manufacturer. The push-down tracks lower the storage capacity of the disk drive.

The present invention retains the use of an otherwise good track 32 having a defective servo wedge 48 by tagging the defective servo wedge and not having the disk control system 56 account for its presence. The defective servo wedges are tagged by scanning the servo wedges 36 for defects and adding location information for each defective servo wedge to a list. The scanning operation for detecting defective servo wedges is typically performed during the initial manufacture and configuration of the disk drive 30 by the disk-drive manufacturer. The list is accessed by the disk control system during track following operations. In accordance with the invention, a track following operation continues through the defective servo wedge, but a write operation is prevented for a predetermined number of servo wedges 36 after the defective servo wedge to allow the head 42 to return to within the servo-fault position threshold 40. The write operation is prevented, without a lost revolution of the rotating disk 34, by not having data written in the skipped data wedges 38 between the predetermined number of servo wedges. In contrast, an aborted write operation may result in at least one lost revolution of the rotating disk. The data segments or blocks are numbered such that the skipped wedges are pushed down meaning that the data segments stored in a data wedge before a tagged servo wedge are contiguously numbered with data segments stored in the data wedge after the last servo wedge of the predetermined number of servo wedges.

The location information for the tagged servo wedges 48 may be stored in read/writeable non-volatile semiconductor memory 70 in the disk control system or in reserved data wedges 72 on the disk 34. The stored location information for the tagged servo wedges may be transferred to dynamic random access memory 74 for use by the disk control system 56 during the real-time track following operation. The predetermined number of servo wedges 36 for which user data write operations are prevented may be between about 7 and 10 for a track 32 having more than about 70 embedded servo wedges. The predetermined number of servo wedges is selected so that the disk control system may have ample settling time to position the head 42 to within the desired servo-fault position threshold 40 without unnecessarily skipping data wedges 38. A servo wedge may be tagged if the servo wedge has a position from a respective circular track centerline 46 that is greater than the servo-fault threshold 40 or if it includes an embedded data error.

Data segments may be located in the data wedges 38 independently of locations of the servo wedges 36. A disk drive 30 for writing data segments in locations of the data wedges independent of the servo wedges is described in U.S. Pat. No. 5,956,196 titled DISK DRIVE EMPLOYING DYNAMICALLY RECONFIGURED READ CHANNEL TO PROCESS A READ SIGNAL AT TWO DIFFERENT FREQUENCIES, which patent is incorporated herein in its entirety by reference.

Figure 4:
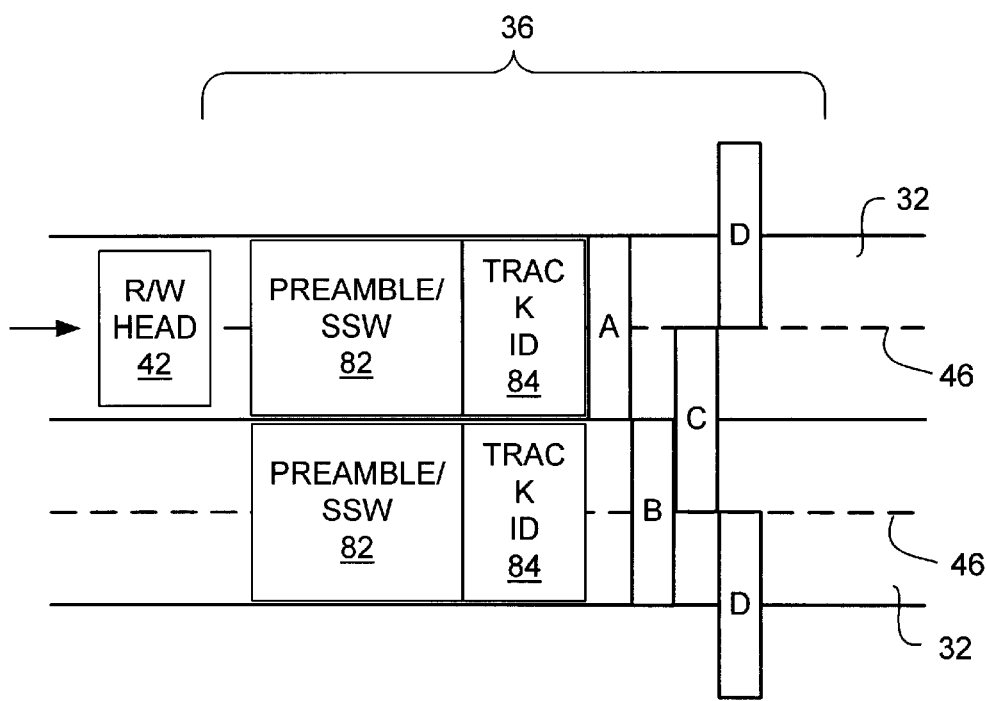
FIG. 4 is a schematic diagram of a representative servo wedge, according to the present invention.

A representative servo wedge 36 is shown in more detail in FIG. 4. On each track 32, the servo wedge has a preamble 82 and a track identification code 84. Within and between the tracks are four servo bursts, A, B, C and D, respectively, for providing head 42 position information with respect to the track centerline 46 to the disk control system 56. A servo wedge may be defective due to a data error in the encoding of the preamble or the track identification code, or due to a positional error of one or more of the servo bursts, or similar defect.

We claim:

1. A method for improving data storage capacity of concentric data tracks on a rotating disk in a disk drive, wherein each data track comprises a plurality of embedded servo wedges separating a plurality of data wedges, the method comprising:

establishing a servo-fault position threshold for aborting a write operation if a transducer head position error from a circular track centerline exceeds the servo-fault position threshold;

tagging servo wedges having defects;

ignoring the servo-fault position threshold at a tagged servo wedge during a track following operation thereby preventing the tagged servo wedge from aborting a write operation;

preventing the write operation for a predetermined number of servo wedges immediately following the tagged servo wedge by skipping data wedges between the tagged servo wedge and a last servo wedge of the predetermined number of servo wedges; and writing data to a data wedge immediately following the last servo wedge.

2. A method for improving data storage capacity in a disk drive as defined in claim 1, wherein the step of tagging servo wedges comprises storing location information for the tagged servo wedges in read/writeable non-volatile semiconductor memory.

3. A method for improving data storage capacity in a disk drive as defined in claim 2, wherein the step of tagging servo wedges further comprises transferring stored location information for the tagged servo wedges from the read/writeable non-volatile semiconductor memory to dynamic random access memory for the track following operation.

4. A method for improving data storage capacity in a disk drive as defined in claim 1, wherein the step of tagging servo wedges comprises storing the location information for the tagged servo wedges in reserved data wedges on the disk.

5. A method for improving data storage capacity of concentric data tracks on a rotating disk in a disk drive, wherein each data track comprises a plurality of embedded servo wedges separating a plurality of data wedges, the method comprising:

establishing a servo-fault position threshold for aborting a write operation if a transducer head position error from circular track centerline exceeds the servo-fault position threshold;

tagging servo wedges having defects including:
storing the location information for the tagged servo wedges in reserved data wedges on the disk, and
transferring stored location information for the tagged servo wedges from the reserved data wedges to dynamic random access memory for the track following operation;

ignoring the servo-fault position threshold at a tagged servo wedge during a track following operation thereby preventing the tagged servo wedge from aborting a write operation;

preventing the write operation for a predetermined number of servo wedges immediately following the tagged servo wedge by skipping data wedge between the tagged servo wedge and a last servo wedge of the predetermined number of servo wedges; and writing data to a data wedge immediately following the last servo wedge.

6. A method for improving data storage capacity of concentric data tracks on a rotating disk in a disk drive, wherein each data track comprises a plurality of embedded servo wedges separating a plurality of data wedges, the method comprising:

establishing a servo-fault position threshold for aborting a write operation if a transducer head position error from a circular track centerline exceeds the servo-fault position threshold;

tagging servo wedges having defects;

ignoring the servo-fault position threshold at a tagged servo wedge during a track following operation thereby preventing the tagged servo wedge from aborting a write operation;

preventing the write operation for a predetermined number of servo wedges immediately following the tagged servo wedge by skipping data wedges between the tagged servo wedge and a last servo wedge of the predetermined number of servo wedges, wherein the number of the plurality of embedded servo wedges on a track is greater than about 70 and the predetermined number of servo wedges is between about 7 and 10; and writing data to a data wedge immediately following the last servo wedge.

7. A method for improving data storage capacity in a disk drive as defined in claim 1, wherein data segments are located in the data wedges independently of locations of the servo wedges.

8. A method for improving data storage capacity in a disk drive as defined in claim 1, wherein a servo wedge is tagged if the servo wedge has a position from a respective circular track centerline that is greater than the servo-fault threshold.

9. A method for improving data storage capacity in a disk drive as defined in claim 1, wherein a servo wedge is tagged if the servo wedge includes an embedded data error.

10. A disk drive for improving data storage capacity of concentric data tracks on a rotating disk, each data track having a plurality of embedded servo wedges separating a plurality of data wedges, the disk drive comprising:

means for establishing a servo-fault position threshold for aborting a write operation if a transducer head position error from a circular track centerline exceeds the servo-fault position threshold;

means for tagging servo wedges having defects;

means for ignoring the servo-fault position threshold at a tagged servo wedge during a track following operation thereby preventing the tagged servo wedge from aborting a write operation;

means for preventing the write operation for a predetermined number of servo wedges immediately following the tagged servo wedge by skipping data wedges between the tagged servo wedge and a last servo wedge of the predetermined number of servo wedges; and means for writing data to a data wedge immediately following the last servo wedge.

11. A disk drive for improving data storage capacity in a as defined in claim 10, wherein the means for tagging servo wedges comprises means for storing location information for the tagged servo wedges in read/writeable non-volatile semiconductor memory.

12. A disk drive for improving data storage capacity as defined in claim 11, wherein the means for tagging servo wedges further comprises means for transferring stored location information for the tagged servo wedges from the read/writeable non-volatile semiconductor memory to dynamic random access memory for the track following operation.

13. A disk drive for improving data storage capacity as defined in claim 10, wherein the means for tagging servo wedges comprises means for storing the location information for the tagged servo wedges in reserved data wedges on the disk.

14. A disk drive for improving data storage capacity of concentric data tracks on a rotating disk, each data track having a plurality of embedded servo wedges separating a plurality of data wedges, the disk drive comprising:

means for establishing a servo-fault position threshold for aborting a write operation if a transducer head position error from a circular track centerline exceeds the servo-fault position threshold;

means for tagging servo wedges having defects, including
means for storing the location information for the tagged servo wedges in reserved data wedges on the disks, and
means for transferring stored location information for the tagged servo wedges from the reserved data wedges to dynamic random access memory for the track following operation.

means for ignoring the servo-fault position threshold at a tagged servo wedge during track following operation thereby preventing the tagged servo wedge from aborting a write operation;

means for preventing the write operation for a predetermined number of servo wedges immediately following the tagged servo wedge by skipping data wedges between the tagged servo wedge and a last servo wedge of the predetermined number of servo wedges; and means for writing data to a data wedge immediately following the last servo wedge.

15. A disk drive for improving data storage capacity of concentric data tracks on a rotating disk each data track having a plurality of embedded servo wedges separating a plurality of data wedges, the disk drive comprising:

means for establishing a servo-fault position threshold for aborting a write operation if a transducer head position error from a circular track centerline exceeds the servo-fault position threshold;

means for tagging servo wedges having defects;

means for ignoring the servo-fault position threshold at a tagged servo wedge during a track following operation thereby preventing the tagged servo wedge from aborting a write operation;

means for preventing the write operation for a predetermined number of servo wedges immediately following the tagged servo wedge by skipping data wedges between the tagged servo wedge and a last servo wedge of the predetermined number of servo wedges, wherein the number of the plurality of embedded servo wedges on a track is greater than about 70 and the predetermined number of servo wedges is between about 7 and 10; and means for writing data to a data wedge immediately following the last servo wedge.

16. A disk drive for improving data storage capacity as defined in claim 10, wherein data segments are located in the data wedges independently of locations of the servo wedges.

17. A disk drive for improving data storage capacity as defined in claim 10, wherein a servo wedge is tagged if the servo wedge has a position from a respective circular track centerline that is greater than the servo-fault threshold.

18. A disk drive for improving data storage capacity as defined in claim 10, wherein a servo wedge is tagged if the servo wedge includes an embedded data error.

* * * * *